US009882817B2

(12) United States Patent
Turlington et al.

(10) Patent No.: US 9,882,817 B2
(45) Date of Patent: Jan. 30, 2018

(54) INTER-DEVICE POLICING ON NETWORK INTERFACE DEVICES IN LAG CONFIGURATION

(71) Applicant: Verizon Patent and Licensing Inc., Basking Ridge, NJ (US)

(72) Inventors: Matthew W. Turlington, Richardson, TX (US); Michael U. Bencheck, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1070 days.

(21) Appl. No.: 13/927,160

(22) Filed: Jun. 26, 2013

(65) Prior Publication Data
US 2015/0006755 A1    Jan. 1, 2015

(51) Int. Cl.
*G06F 15/16*  (2006.01)
*H04L 12/813*  (2013.01)
*H04L 12/823*  (2013.01)
*H04L 12/891*  (2013.01)
*H04L 12/873*  (2013.01)
*H04L 12/24*  (2006.01)

(52) U.S. Cl.
CPC .......... *H04L 47/20* (2013.01); *H04L 41/5019* (2013.01); *H04L 47/326* (2013.01); *H04L 47/41* (2013.01); *H04L 47/527* (2013.01); *H04L 41/0893* (2013.01); *Y02B 60/33* (2013.01)

(58) Field of Classification Search
CPC ... H04L 47/20; H04L 41/5019; H04L 47/326; H04L 47/41; H04L 47/527; H04L 41/0893; Y02B 60/33
USPC ....................................................... 709/233
See application file for complete search history.

(56) References Cited

U.S. PATENT DOCUMENTS

| 2010/0290343 | A1* | 11/2010 | Tanaka ................. H04L 12/4645 370/235 |
| 2012/0266013 | A1* | 10/2012 | Shannon ................. H04L 41/08 714/4.2 |
| 2014/0101228 | A1* | 4/2014 | Dalela ............... G06Q 10/06315 709/203 |
| 2017/0026232 | A1* | 1/2017 | Janardhanan ........... H04L 49/30 |

* cited by examiner

Primary Examiner — Bryan Lee
Assistant Examiner — Oluwatosin Gidado

(57) ABSTRACT

A master network interface device (NID) receives a first packet flow associated with a particular customer via a first link of a link aggregation group (LAG). The master NID also receives, from a non-master NID, an indication of a second packet flow, associated with the particular customer, that are traversing a second link of the LAG. The master NID applies collective rate limiting criteria to the first packet flow and to the second packet flow, such that the collective rate limiting criteria enforces a SLA rate for the particular customer. The master NID forwards at least some of the first packet flow via the first link, based on the rate limiting criteria as applied to the first packet flow. The master NID also sends, to the non-master network interface device, an indication of the rate limiting criteria as applied to the second packet flow.

20 Claims, 8 Drawing Sheets

INTER-DEVICE POLICING ON NETWORK INTERFACE DEVICES IN LAG CONFIGURATION

BACKGROUND

Link aggregation is a mechanism used to transport data between end points using multiple network links and/or ports. For example, a link aggregation group (LAG) may include two or more physical links connecting two end point devices. In a LAG, the physical links are configured to act as a single logical connection between the two end point devices. In some cases, a link may be designated as active and a redundant link may be designated for standby mode.

DETAILED DESCRIPTION OF PREFERRED EMBODIMENTS

The following detailed description refers to the accompanying drawings. The same reference numbers in different drawings may identify the same or similar elements.

Systems and methods described herein may enable rate limiting across multiple switch ports on service switches in a link aggregation group (LAG). In the case of a LAG where multiple links (or members) of a LAG are active, rate limiting across multiple switch ports is sometimes necessary to prevent customers from utilizing more bandwidth (e.g., combined over multiple links) than allowed by their contracted service level agreement (SLA) rate. Prior solutions to prevent exceeding an SLA rate over multiple links required that a service provider use only one active link and while maintaining one or more other links in a standby mode. However, use of such dedicated standby links is an inefficient use of bandwidth.

Systems and methods described herein may use two network interface devices (NIDs) connected together via an inter-chassis link to police multiple active links in a LAG. One NID can be specified as the master NID. The master NID may contain token bucket policers used for inter-chassis policing (e.g., policing collectively between the two NIDs). As packets enter the master NID, policer tokens may be removed from the token bucket for policing purposes. Additionally, if packets enter the non-master NID, the non-master NID will signal (e.g., using the inter-chassis link) a request for tokens from the master token bucket. This communication enables the use of both links in a LAG with greater efficiency while also ensuring customer compliance with their SLA rate.

According to an implementation described herein, a master NID may receive a first packet flow associated with a particular customer via a first link of a LAG. The master NID may also receive, from a non-master NID, an indication of a second packet flow, associated with the particular customer, that are traversing a second link of the LAG. The master NID may apply collective rate limiting criteria to the first packets associated with a particular customer and to the second packets associated with the particular customer, such that the collective rate limiting criteria enforces a SLA rate for the particular customer. The master NID may forward at least some of the first packets via the first link, based on the rate limiting criteria as applied to the first packets. The master NID may also send, to the non-master network interface device, an indication of the rate limiting criteria as applied to the second packets to enable the non-master NID to forward at least some of the second packets via the second link, based on the rate limiting criteria as applied to the second packets.

Figure 1:
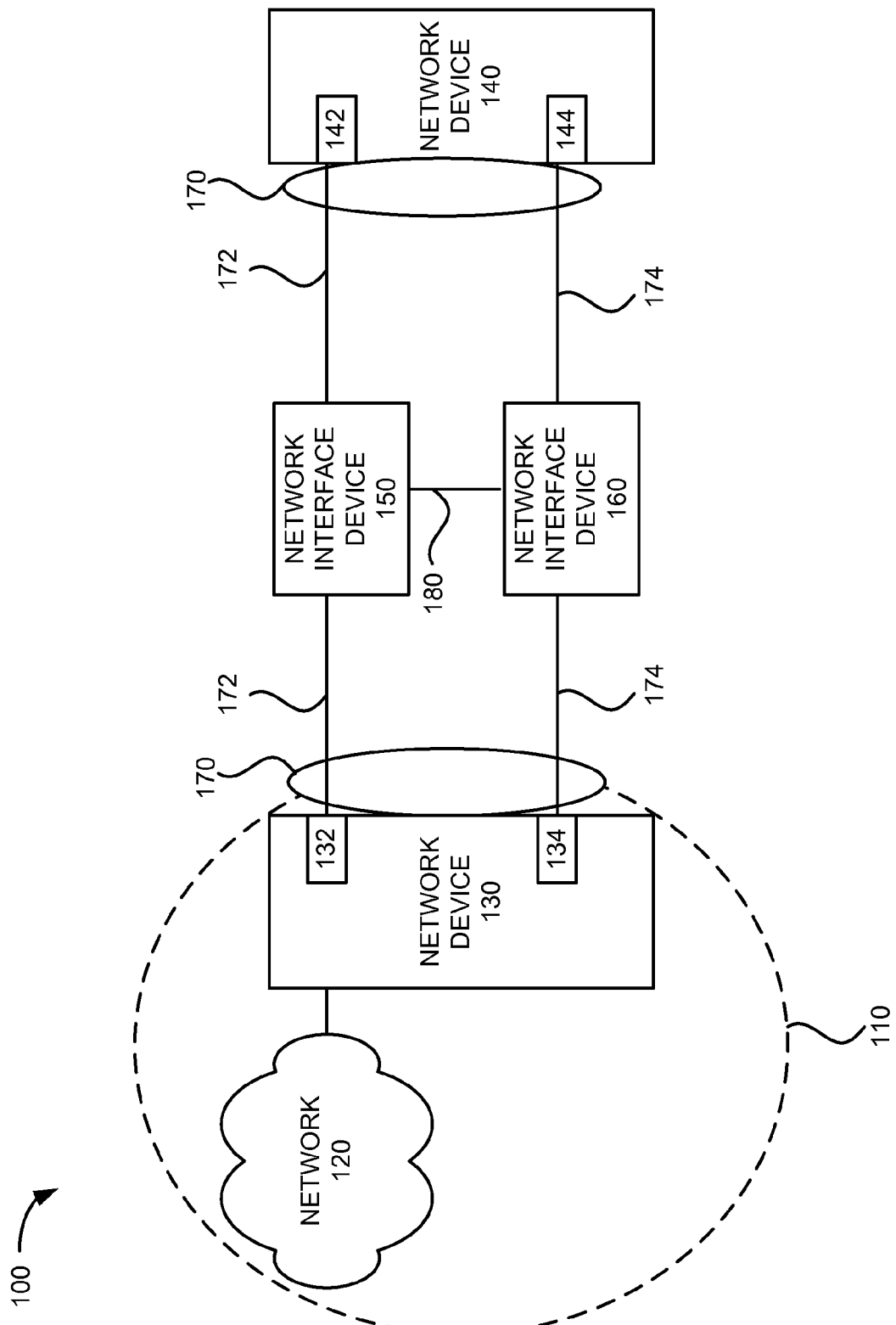
FIG. 1 depicts an exemplary network in which systems and methods described herein may be implemented.

FIG. 1 is a block diagram of an exemplary network 100 in which systems and methods described herein may be implemented. Network 100 may include network 120, network devices 130 and 140, network interface devices (NIDs) 150 and 160, links 172 and 174 and inter-chassis link 180. In an exemplary implementation, network 120 and network device 130 may be part of spanning tree protocol (STP) domain 110 (illustrated within the dotted line in FIG. 1) that includes network 120. In one implementation, network 120 may include a switched Ethernet system/network (SES). Alternatively, network 120 and domain 110 may represent any network in which data is transmitted from customer sites to other devices in network 100.

In an exemplary implementation, network device 130 may represent a switch, such as a layer 2 switch, that is used to transmit or forward traffic to other devices in network 100. In one implementation, network device 130 may represent a switch with an external network to network interface (ENNI). That is, network device 130 may provide the interface between network 120 and external devices/networks. Network device 130 may include edge ports 132 and 134 used to forward and receive data from other devices in network 100 via links 172 and 174. Only two edge ports are shown on network device 130 for simplicity. It should be understood that network device 130 may include additional ports (e.g., edge ports) for receiving and transmitting data.

Network device 140 may represent a switch, such as a layer 2 switch, used to transmit or forward traffic to other devices in network 100, such as network device 130. Network device 140 may include edge ports 142 and 144 used to forward and receive data from other devices in network 100. In an exemplary implementation, network device 130 may be coupled to network device 140 via a LAG. For example, referring to FIG. 1, network device 130 may be coupled to network device 140 via LAG 170, which includes links 172 and 174.

Links 172 and 174 may include wired, wireless, and/or optical transmission media coupling network devices 130 and 140 in a LAG configuration. A LAG, as discussed briefly above, includes two or more links that are configured to act as a single logical connection between the end point devices. Therefore, in this implementation, LAG 170 includes links 172 and 174 that are configured to act as a single logical connection for routing data between network devices 130 and 140.

NIDs 150 and 160 may each represent an interface device that monitors traffic (e.g., packets) flowing between various networks/network devices. For example, NIDs 150 and 160 may monitor traffic flow from network device 140 to network device 130. In an exemplary implementation, NIDs 150 and 160 may monitor or police traffic for quality of service (QoS) or service level agreement (SLA) purposes, as described in detail below.

NIDs 150 and 160 may each be positioned as a "bump-in-the-wire" between network devices 130 and 140. In an exemplary implementation, NIDs 150 and 160 may demarcate the boundary between the service provider's administrative domain or network and the customer's administrative domain or network. In such an implementation, NIDs 150 and 160 may be located at the "handoff" from the service provider to the customer. For example, network device 140 may represent a customer's edge device (e.g., a device located at a point where the customer's network interfaces with an external network) and network device 130 may represent a service provider's edge device (e.g., a device located at a point where the service provider's network interfaces with a customer's network).

Inter-chassis link 180 may include a wired, wireless and/or optical transmission media coupling NIDs 150 and 160. In an exemplary implementation, inter-chassis link 180 may function as a management link and allow NIDs 150 and 160 to exchange control communications. For example, NIDs 150 and 160 may exchange information via inter-chassis link 180 to synchronize allocation of policer tokens with respect to LAG 170.

The network configuration illustrated in FIG. 1 is provided for simplicity. It should be understood that a typical network 100 may include more or fewer network devices, NIDs, and links. For example, LAG 170 may include more than two links. Network 100 may also include additional elements, such as gateways, routers, monitoring systems, etc., that aid in routing traffic and monitoring a LAG.

Figure 2:
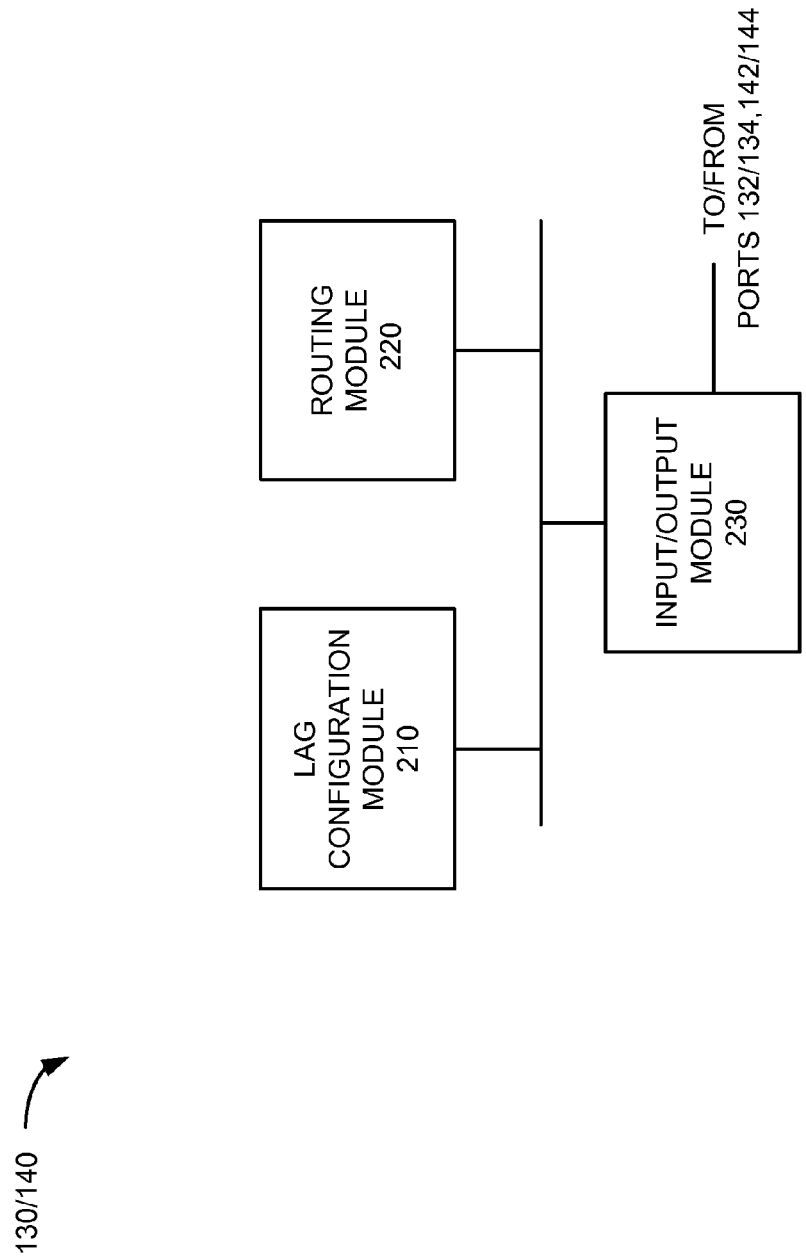
FIG. 2 illustrates a block diagram of exemplary components implemented in one or more of the network devices of FIG. 1.

FIG. 2 illustrates an exemplary configuration of network device 130. Network device 140 may be configured in a similar manner. Referring to FIG. 2, network device 130 may include LAG configuration module 210, routing module 220 and input/output module 230. The exemplary configuration illustrated in FIG. 2 is provided for simplicity. It should be understood that network devices 130 and 140 may include more or fewer modules than illustrated in FIG. 2.

LAG configuration module 210 may include logic that is associated with configuring a LAG. For example, LAG configuration module 210 of network device 130 may include logic for setting up parameters for a LAG, such as LAG 170, between network device 130 and network device 140. As one example, LAG configuration module 210 may be associated with configuring a speed at which data will be transmitted via the LAG, configuring the number of links in the LAG, configuring which ports will transmit/receive via the LAG links, configuring one network device in the LAG group as a master device and another as a non-master device, configuring the LAG for automated set up in which the LAG is automatically configured, configuring the LAG for manual set up requiring an operator to set up the LAG, etc.

Routing module 220 may include logic for routing data between end point devices. For example, routing module 220 may identify forwarding information for routing data frames between network devices 130 and 140 via LAG 170.

Input/output module 230 may include logic for receiving and outputting data frames via network devices 130/140. For example, input/output module 230 of network device 130 may route data to ports 132 and 134 for transmission to network device 140, and receive data at ports 132 and 134 transmitted from ports 142 and 144 of network device 140.

In an exemplary implementation, LAG configuration module 210, routing module 220 and input/output module 230 may include one or more processors, microprocessors or other processing logic used to interpret and execute instructions. In such implementations, LAG configuration module 210, routing module 220 and input/output module 230 may include software instructions (or sequences of instructions) stored in a computer-readable medium. A computer-readable medium may be defined as one or more non-transitory memory devices. The software instructions may be read into memory from another computer-readable medium or from another device via a communication interface. The software instructions contained in memory may cause the various components, such as LAG configuration module 210, routing module 220 and input/output module 230, to perform processes that are described below. Alternatively, hardwired circuitry may be used in place of or in combination with software instructions to implement processes consistent with exemplary embodiments. Thus, systems and methods described herein are not limited to any specific combination of hardware circuitry and software.

Figure 3:
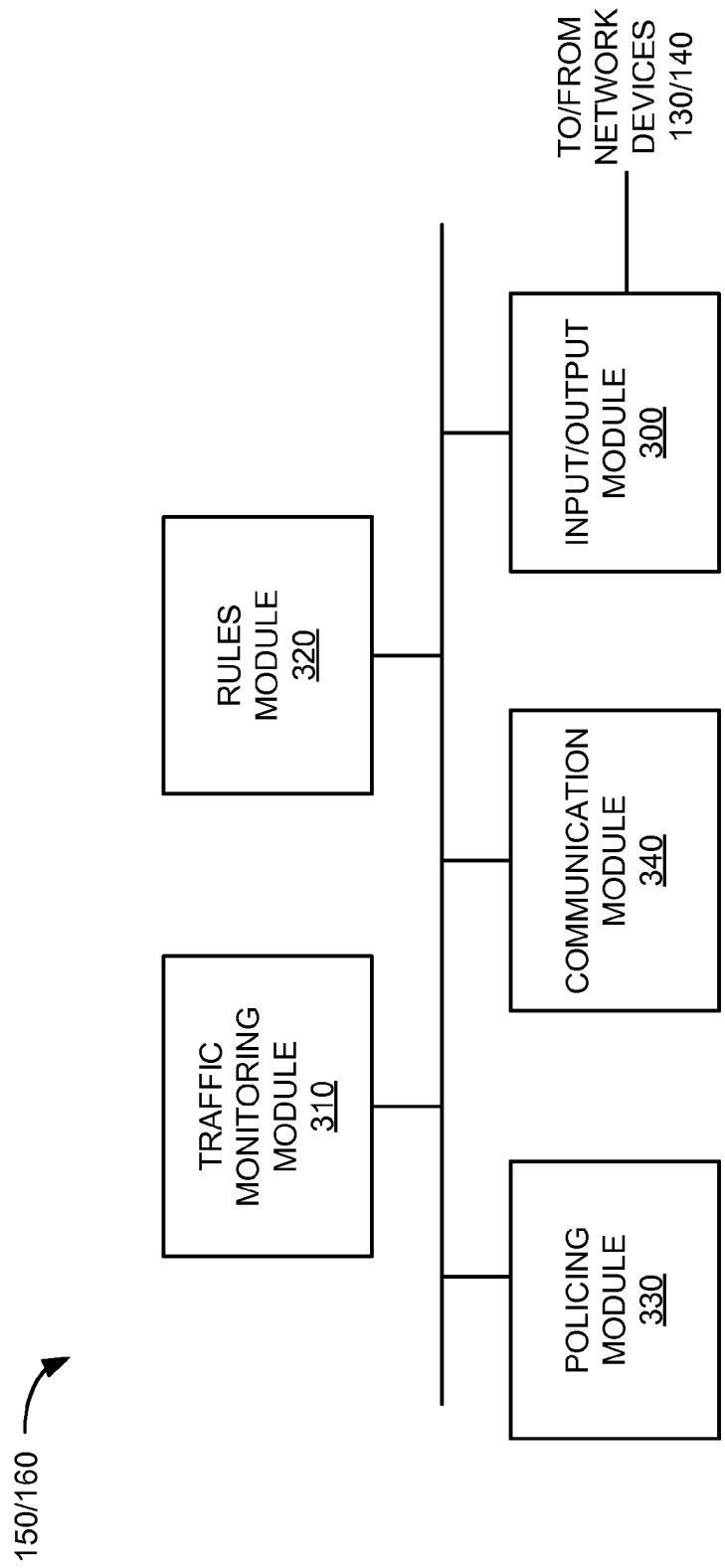
FIG. 3 illustrates a block diagram of exemplary components implemented in one or more of the network interface devices of FIG. 1.

FIG. 3 illustrates an exemplary configuration of NID 150. NID 160 may be configured in a similar manner. Referring to FIG. 3, NID 150 may include input/output module 300, traffic monitoring module 310, rules module 320, policing module 330, and communication module 340. The exemplary configuration illustrated in FIG. 3 is provided for simplicity. It should be understood that NIDs 150 and 160 may include more or fewer components than illustrated in FIG. 3.

Input/output module 300 may include logic for receiving and outputting data via one or more links of LAG 170. For example, input/output module 300 may route data from user ports on NID 150 to network ports on NID 150. In some implementations, input/output module 300 may include queues and buffers for temporarily buffering data for output via network ports on NID 150.

Figure 4:
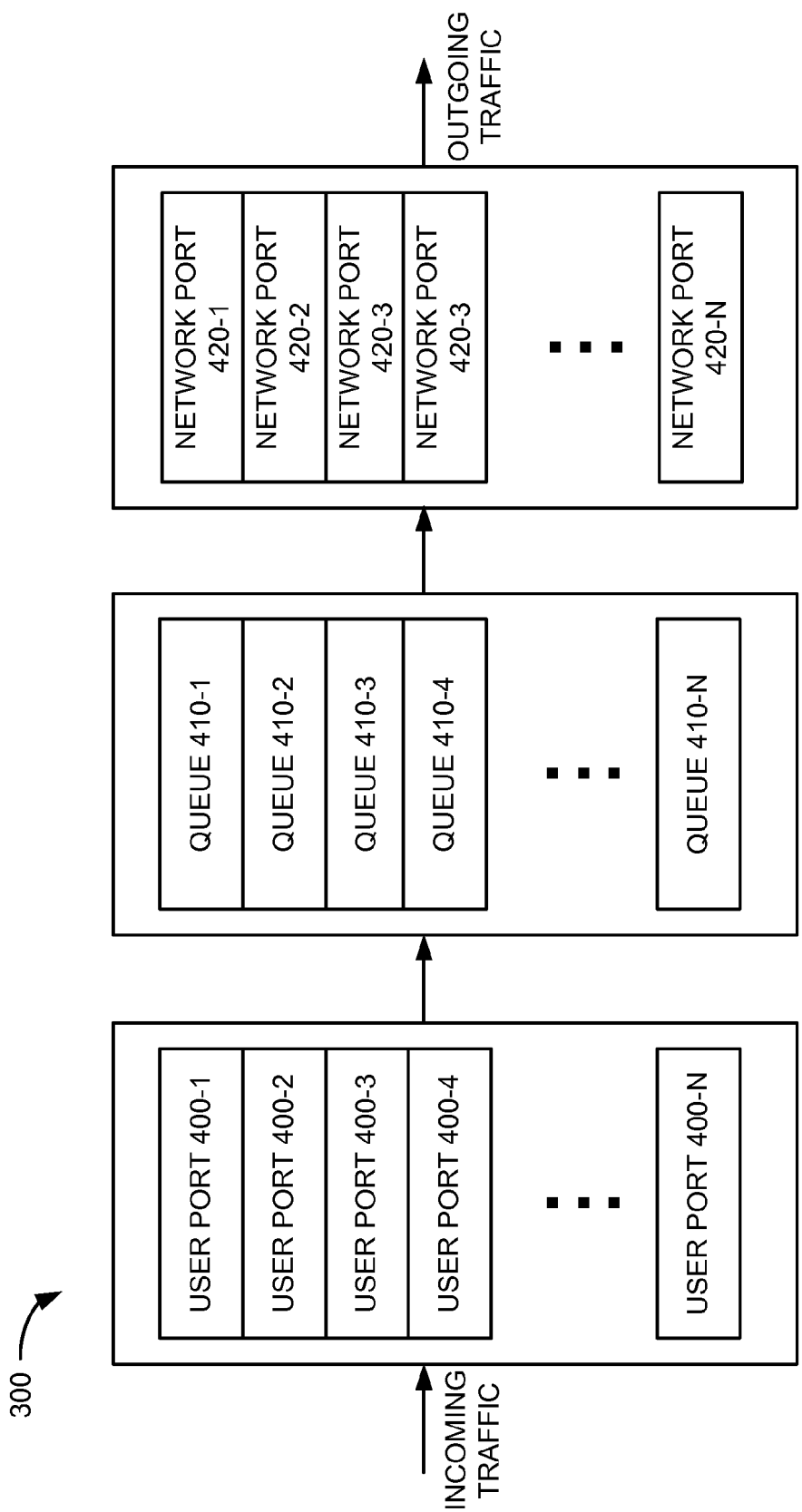
FIG. 4 illustrates a portion of one or more of the network interface devices of FIG. 1 in accordance with an exemplary implementation.

As an example, FIG. 4 illustrates a number of user ports labeled 400-1 through 400-N (referred to collectively as user ports 400), a number of queues labeled 410-1 through 410-N (referred to collectively as queues 410) and a number of network ports 420-1 through 420-N (referred to collectively as network ports 420) located on NID 150. It should be understood that additional devices, such as additional buffers, queues and/or ports, may be included in input/output module 300. Incoming traffic received by NID 150/160 may be received on one of user ports 400, queued in one of queues 410 (depending on the traffic load) and forwarded to one of network ports 420 for transmission via one of the links in LAG 170 (e.g., link 172). In an exemplary implementation, queues 410 may be divided into queues associated with various customer traffic, such as queues that each will handle traffic for different customers. For example, information included in a header of an incoming data frame may indicate that a data flow is associated with a particular customer or port.

Returning to FIG. 3, traffic monitoring module 310 may include logic that monitors traffic flows, such as data flows between user ports 400 and network ports 420 on input/output module 300. User ports 400 on NIDs 150/160 may represent ports coupled to edge ports 142/144 of network device 140 that receive, for example, customer traffic. Network ports 420 on NIDs 150/160 may represent ports coupled to edge ports 132/134 of network device 130 that forward, for example, customer traffic to/from a service provider's network (e.g., network 110 or network 120).

Traffic monitoring module 310 may associate a traffic flow with a particular customer. For example, traffic monitoring module 310 may identify data flows traversing NID 150. In an exemplary implementation, traffic monitoring module 310 may identify certain combinations of information in various fields of a data flow. These fields may include media access control (MAC) source and destination address (SA, DA) fields, a virtual local area network identifier (VLAN ID) field, a class of service/priority code point (COS/PCP) field, layer 3 information field(s), etc. The information identified in one or more of these fields, such as the DA, SA and/or VLAN ID, may be used by NID 150 to particularly identify data flows and further identify links upon which the data flows are transmitted. In one implementation, traffic monitoring module 310 may continuously monitor traffic received by NIDs 150/160.

Rules module 320 may store rules associated with how customer traffic should be routed on NIDs 150/160 in accordance with service guidelines. In one implementation, customer traffic may be routed through different queues (e.g., queues 410) for each customer. Rules module 320 may assign traffic to a particular queue for a particular customer based on indications from traffic monitoring module 310. In one implementation, each customer queue may be associated with data rate limits in accordance with, for example, a customer's service level agreement. For example, one customer queue may have a guaranteed data rate of 15 Mbps and a different customer queue may have a guaranteed data rate of 50 Mbps.

In an exemplary implementation, rules stored in rules module 320 may be provided to NIDs 150/160 by, for example, network personnel associated with monitoring performance of network domain 110 and/or network 120. For example, network personnel may enter the rules into NIDs 150/160 or forward the rules to NIDs 150/160 for storage in rules module 320. In each case, traffic monitoring module 310 and rules stored in rules module 320 may be designed to aid policing module 330 (in NID 150/160) in maintaining customer traffic flows in accordance with defined limits.

Policing module 330 may enforce rate limits for customer traffic according to service level agreements. In implementations described herein, policing module 330 may enforce collective traffic rate limits for individual customers across multiple links (e.g., links 172/174) of a LAG (e.g., LAG 170). Policing to enforce the collective traffic rate limits may be applied, for example, to separate queues 410 for the same customer on different NIDs 150/160. One policing module 330 may act as a master policing module 330 (shown in FIG. 5), while policing modules 330 on one or more other NIDs 150/160 may act as non-master policing modules 330 (shown in FIG. 6). Selection of a master policing module 330 may be determined, for example, in conjunction with other selections by LAG configuration module 210, manually, or using a different configuration method.

Figure 5:
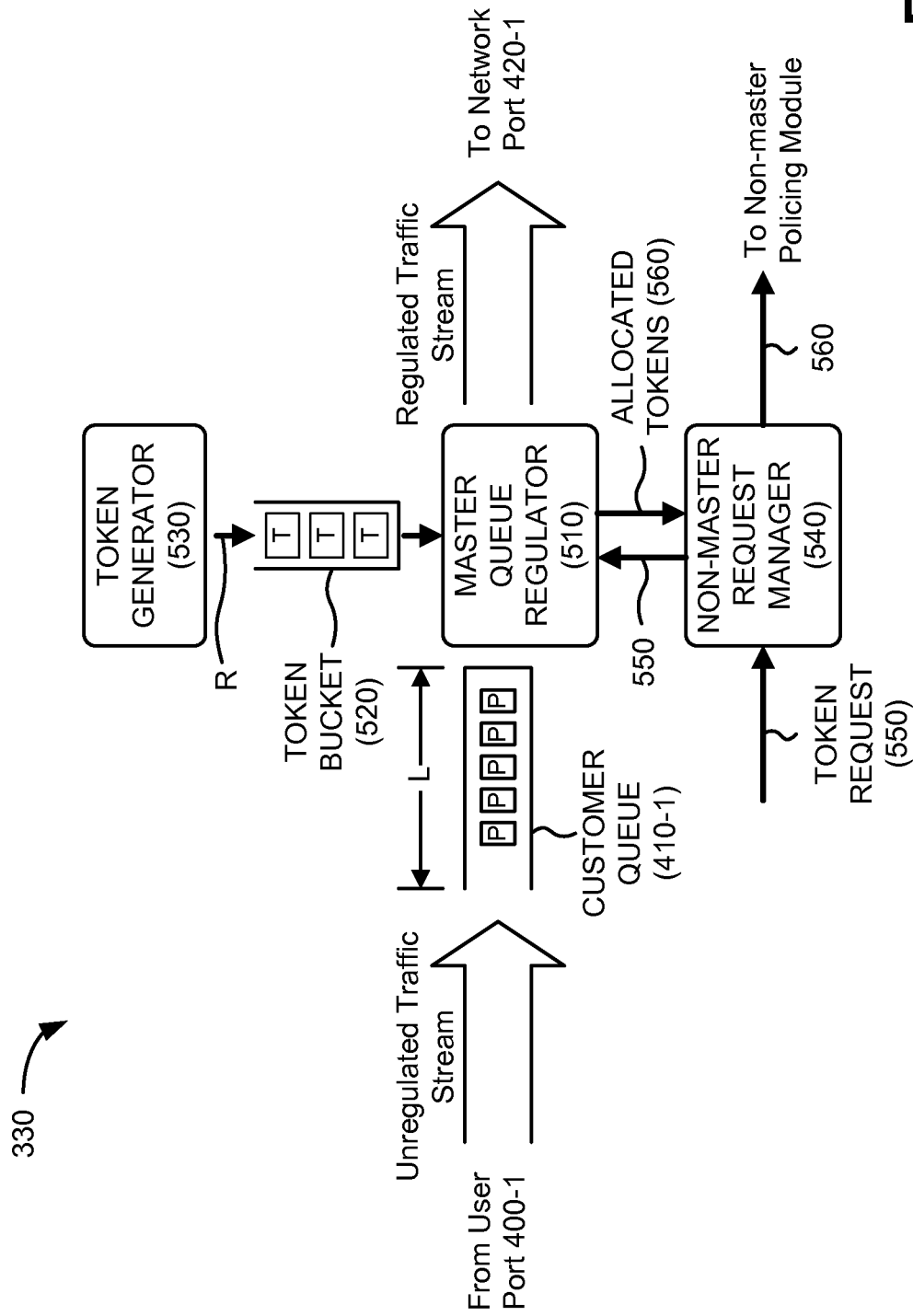
FIG. 5 is a diagram of exemplary functional components of a policing module of one of the network interface devices illustrated in FIG. 1, according to an implementation described herein.

In one implementation, policing module 330 may employ a token bucket rate-limiting mechanism to enforce an average transmission rate (e.g., an average bit rate associated with a particular customer) across multiple queues 410 for the same customer. Although described herein primarily in the context of a token bucket system, in other implementations, different collective rate limiting criteria may be used by sharing information between a master policing module 330 and a non-master policing module 330 (via inter-chassis link 180). FIG. 5 is a diagram of exemplary functional components of a master policing module 330 for network interface 150/160 as applied to a single customer queue 410-1. The average bit rate values associated with customer queue 410-1 may be provided to policing module 330, for example, as part of new customer configuration settings. In this approach, queue 410-1 that includes uplink or downlink traffic to be rate limited may be serviced by a master queue regulator 510. A token bucket 520 may be used to manage master queue regulator 510 to control the rate of uplink/downlink traffic flow from queue 410-1.

A token generator 530 may constantly produce policer tokens (or a group of policer tokens) at a rate of R tokens per second (e.g., where R is based on the average bit rate assigned to queue 410-1) and may place the tokens into token bucket 520. Assuming that each token grants the ability to transmit a fixed number of bytes from queue 500, if token bucket 520 fills, newly generated tokens may be discarded. At the same time, an unregulated stream of packets may arrive and be placed into customer queue 410-1 that has a maximum length of L. If the unregulated stream delivers more packets than customer queue 410-1 can store, the excess packets in customer queue 410-1 may be dropped. For example, in one implementation, excess packets may be dropped based on a random early detection (RED) method, a weighted RED method, or another method.

Master queue regulator 510 may consider a number of factors when deciding whether a packet of size P tokens can be forwarded into the uplink/downlink traffic flow. If token bucket 520 is full, the packet may be forwarded into the network and P tokens may be removed from token bucket 520. If token bucket 520 is empty, the next packet in queue 500 may wait at the head of queue 500 until sufficient tokens are generated and placed in token bucket 520. When token bucket 520 eventually contains the required amount of tokens, that required amount of tokens can be removed from token bucket 520 and the packet is sent into the uplink/downlink traffic flow.

If customer queue 410-1 is the only queue in NIDs 150/160 that is receiving traffic, then all tokens in token bucket 510 may be allocated to customer queue 410-1. However, if another customer queue for the same customer in a different NID 150/160 (e.g., a non-master NID 150/160) is receiving traffic, then master queue regulator 510 may also allocate tokens from token bucket 520 to the policing module 330 in the non-master NID 150/160. For example, a non-master request manager 540 may receive a token request 550 from a non-master policing module 330. Token request 550 may include, for example, a request for a particular number of tokens, an indication of a particular number of packets/data in a queue, or another indication that traffic is being passed through a link on a non-master NID. Token request 550 may be provided, for example, from NID 160 to NID 150 via inter-chassis link 180.

Non-master request manager 540 may forward token request 550 to master queue regulator 510. Master queue regulator 510 may perform an arbitration process to allocate tokens from token bucket 520 to non-master NID 160. For example, master queue regulator 510 may apply an arbitration scheme, such as a first-in first-out scheme, a round robin scheme, a weighted round robin scheme, etc., to allocate a particular amount of tokens from token bucket 520 for queue 410-1 and for token request 550. Master queue regulator 510 may extract tokens from token bucket 520 (if available) and provide allocated tokens 560 to non-master request manager 540. Non-master request manager 540 may, in turn, forward the allocated tokens to the non-master policing module 330.

In one implementation, communications for token request 550 and providing allocated tokens 560 may be conducted via inter-chassis link 180 within a shorter time period than that of a refresh rate of token bucket 520. For example, if token bucket 520 has a refresh rate of 1 millisecond and inter-chassis link 180 provides communications with a rate of 5 microseconds per kilometer, NID 150 and NID 160 may optionally be physically separated by a significant distance (e.g., several kilometers or more).

Figure 6:
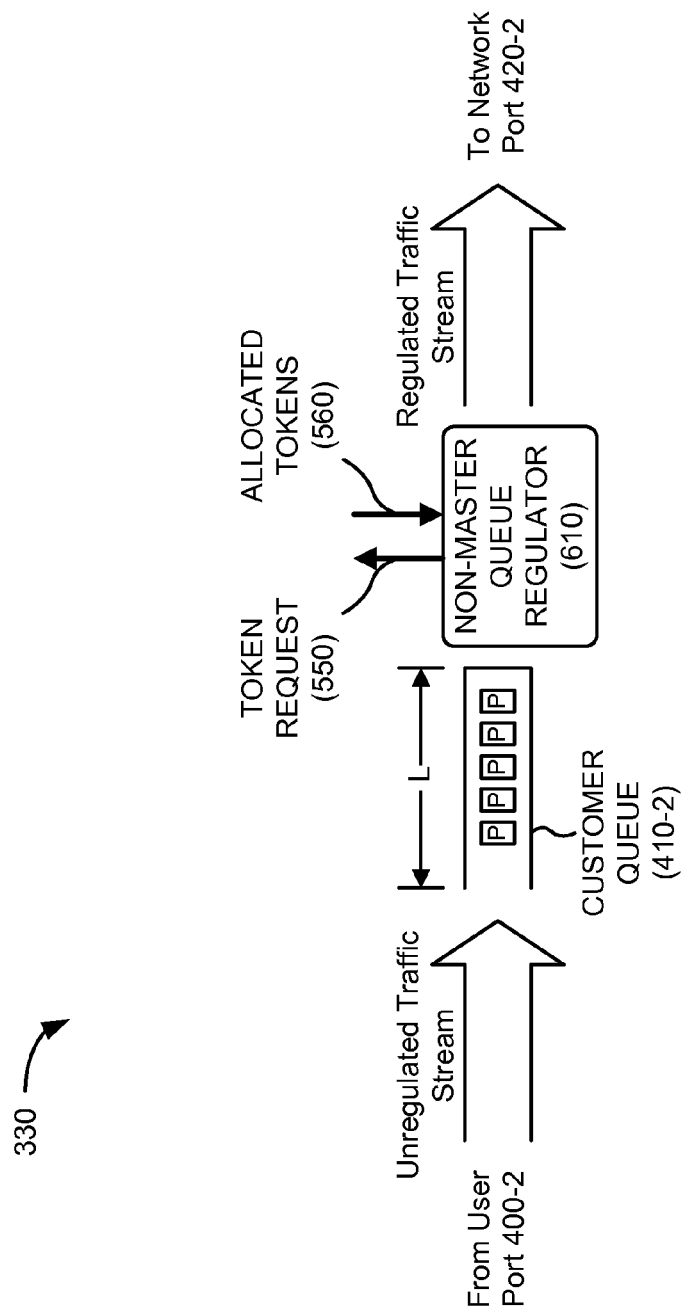
FIG. 6 is a diagram of exemplary functional components of a policing module of one of the network interface devices illustrated in FIG. 1, according to another implementation described herein.

FIG. 6 is a diagram of exemplary functional components of a non-master policing module 330 for network interface 150/160 as applied to a single customer queue 410-2. The average bit rate values associated with customer queue 410-2 may be governed, for example, by master policing module 330. In this approach, queue 410-2 that includes uplink or downlink traffic to be rate limited may be serviced by a non-master queue regulator 610. Traffic from queue 410-2 in non-master policing module 330 (e.g., in NID 160) may be policed with traffic from queue 410-1 in master policing module 330 (e.g., in NID 150) to enforce an average transmission rate across both queues.

Non-master queue regulator 610 may apply tokens to packets from queue 410-2. However, rather than implementing a separate token bucket, non-master policing module 330 may provide token request 550 to master policing module 330 to manage packet transmission rates from queue 410-2. Token request 550 may be provided, for example, from NID 160 to NID 150 via inter-chassis link 180. In response to token request 550, master policing module 330 may provide allocated tokens 560 to non-master queue regulator 610 for sending packets from queue 410-2 into the uplink/downlink traffic flow.

Although FIGS. 5 and 6 shows exemplary components of policing modules 330, in other implementations, policing modules 330 may include fewer components, different components, differently-arranged components, or additional components than those depicted in FIGS. 5 and 6. Also, although policing modules 330 are described in FIGS. 5 and 6 in the context of sharing tokens in a simple token bucket system, in other implementations, other traffic shaping systems and/or rate limiting systems may be used. For example, in another implementation, policing modules 330 may employ traffic shaping variations that permit data bursts.

Returning to FIG. 3, communication module 340 may include logic that allows a NID, such as NID 150, to communicate with other devices, such as NID 160. For example, referring to FIG. 1, NIDs 150 and 160 may be coupled to each other via inter-chassis link 180. Communication module 340 may allow NIDs 150 and 160 to communicate with each other in a peer-to-peer fashion via inter-chassis link 180. In an exemplary implementation, communication module 340 may forward token requests and token allocations between NIDs 150 and 160 via inter-chassis link 180. Communication module 340 may also allow NIDs 150/160 to forward information, such as control information, to other devices in network 100. For example, in some implementations, communication module 340 may allow NID 150 to send control messages to network devices 130 and 140.

In an exemplary implementation, traffic monitoring module 310, rules module 320, policing module 330, communication module 340 and input/output module 350 may include one or more processors, microprocessors or other processing logic used to interpret and execute instructions. In such implementations, traffic monitoring module 310, rules module 320, policing module 330, communication module 340 and input/output module 350 may include software instructions stored in a computer-readable medium. The software instructions may be read into memory from another computer-readable medium or from another device via a communication interface. The software instructions contained in memory may cause the various modules, such as traffic monitoring module 310, rules module 320, policing module 330, communication module 340 and input/output module 350 to perform processes that are described below. Alternatively, hardwired circuitry may be used in place of or in combination with software instructions to implement processes consistent with exemplary embodiments. Thus, systems and methods described herein are not limited to any specific combination of hardware circuitry and software.

Although FIG. 3 shows exemplary functional components of NIDs 150/160, in other implementations, NIDs 150/160 may include fewer functional components, different functional components, differently-arranged functional components, or additional functional components than those depicted in FIG. 3.

Figure 7:
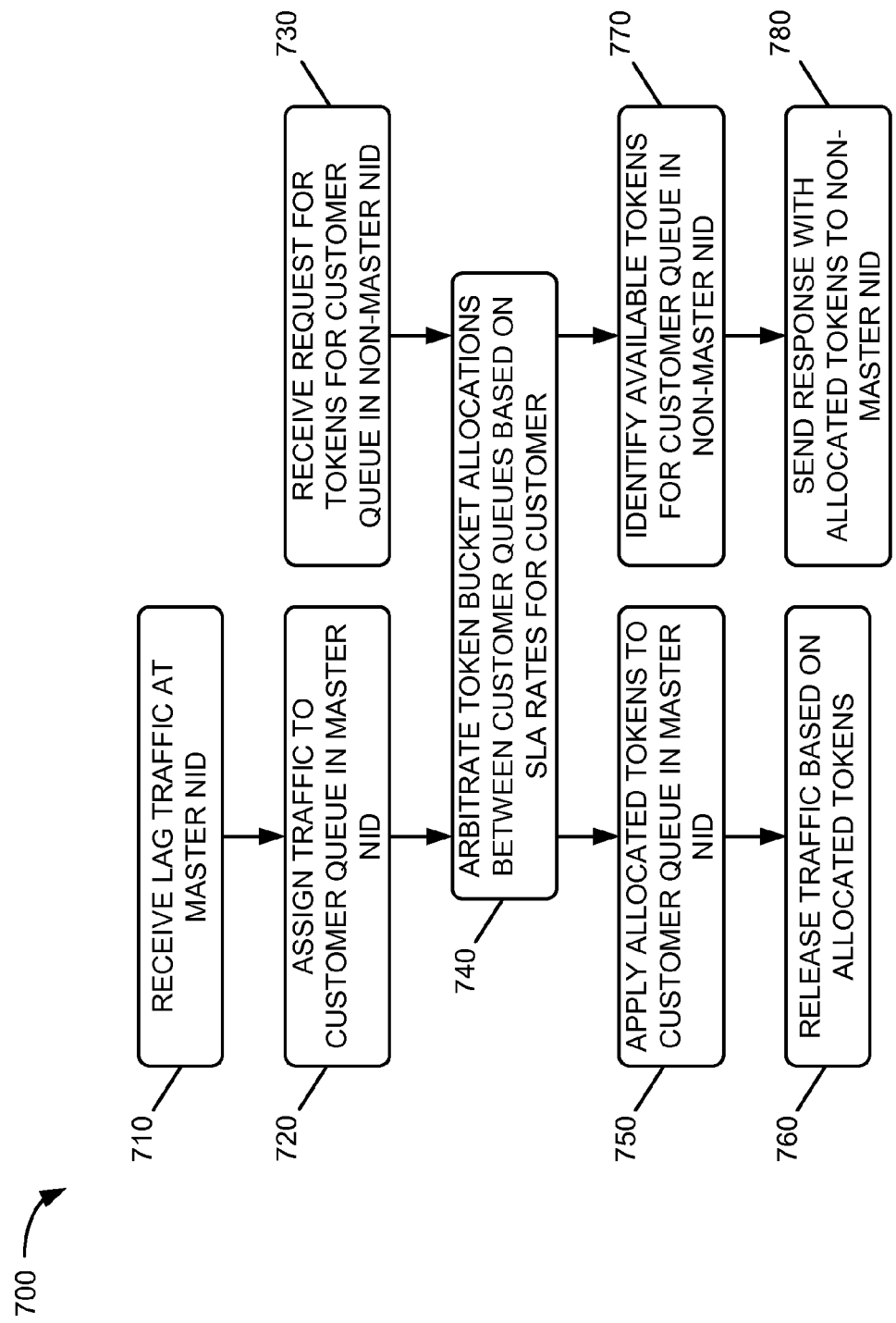
FIG. 7 is a flow chart of an exemplary process for policing inter-device customer traffic by a master network interface device according to an implementation described herein.

FIG. 7 is a flow chart of an exemplary process 700 for policing inter-device customer traffic by a master network interface device according to an implementation described herein. In one implementation, process 700 may be performed by NID 150/160 (e.g., acting as a master NID). In another implementation, some or all of process 700 may be performed by a NID in conjunction with one or more other devices. Process 700 is described with reference to components in figures described above.

As shown in FIG. 7, process 700 may include receiving LAG traffic at a master NID (block 710) and assigning the traffic to a customer queue in the master NID (block 720). For example, assume NID 150 is designated as a master NID in the configuration of FIG. 1. As shown in FIG. 1, NID 150 may receive traffic via link 172 of LAG 170. NID 150 (e.g., traffic monitoring module 310) may identify a particular customer associated with the traffic (e.g., based on packet headers, originating port, etc.). NID 150 may assign traffic associated with the particular customer to a particular queue for that customer (e.g., queue 410-1).

Process 700 may also include receiving a request for tokens for a customer queue in a non-master NID (block 730). For example, assume another customer queue for the same customer in a different NID (e.g., non-master NID 160) is receiving traffic. Non-master NID 160 may send (via inter-chassis link 180) token request 550 to master NID 150. NID 150 (e.g., non-master request manager 540 in policing module 330) may receive token request 550.

Process 700 may further include arbitrating token bucket allocations between the customer queues based on SLA rates for the customer (block 740). For example, master NID 150 (e.g., master queue regulator 510) may perform an arbitration process (e.g., between customer queue 410-1 of NID 150 and customer queue 410-2 of NID 160) to allocate tokens from token bucket 520 to non-master NID 160. NID 150 (e.g., policing module 330) may receive average bit rate values associated with an SLA for a particular customer. NID 150 may be configured to enforce the average bit rate across multiple queues 410 for the same customer (e.g., on different NIDs 150/160). Master queue regulator 510 may apply an arbitration scheme, such as a first-in first-out scheme, a round robin scheme, a weighted round robin scheme, etc., to allocate tokens from token bucket 520 between queues for the same customer.

Process 700 may further include applying allocated tokens to the customer queue in the master NID (block 750) and releasing traffic from the customer queue in the master NID based on the allocated tokens (block 760). For example, master queue regulator 510 may apply allocated tokens from token bucket 520 to packets in customer queue 410-1. Master queue regulator 510 may forward the packets, according to the allocated tokens, to network port 420 for forwarding along the LAG link (e.g., link 172).

Process 700 may also include identifying available tokens for the customer queue in the non-master NID (block 770), and sending a response with the allocated tokens to the non-master NID (block 780). For example, master queue regulator 510 may extract tokens from token bucket 520 (if allocated) for the customer queue in NID 160 and notify NID 160 of the allocated tokens (e.g., via inter-chassis link 180).

Figure 8:
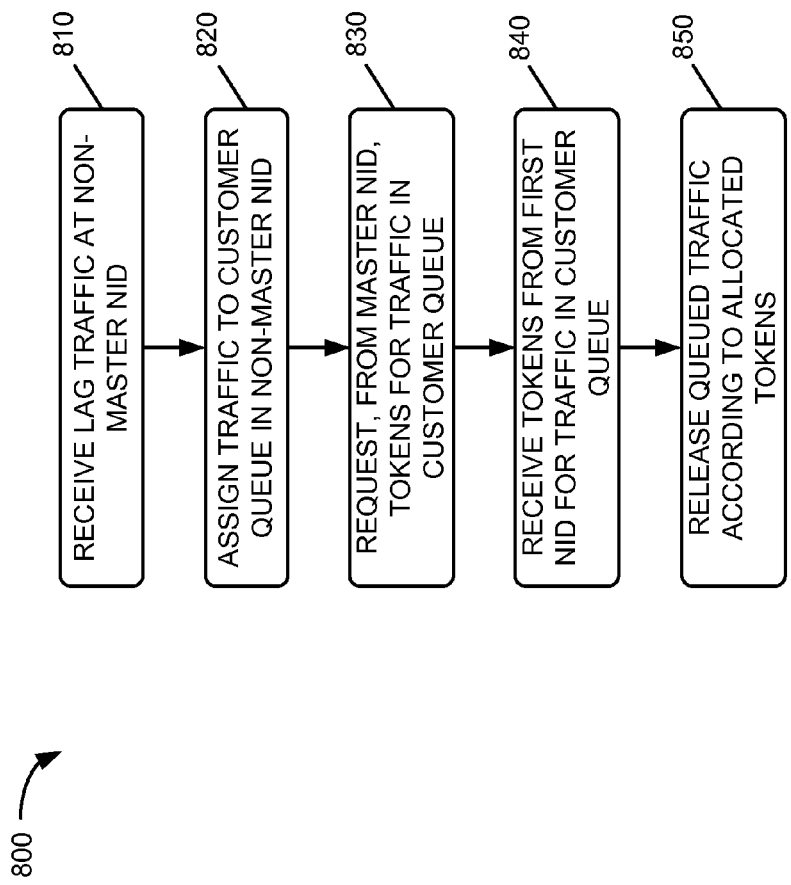
FIG. 8 a flow chart of an exemplary process for policing inter-device customer traffic by a non-master network interface device according to an implementation described herein.

FIG. 8 is a flow chart of an exemplary process 800 for policing inter-device customer traffic by a non-master network interface device according to an implementation described herein. In one implementation, process 800 may be performed by NID 150/160 (e.g., acting as a non-master NID). In another implementation, some or all of process 800 may be performed by a NID in conjunction with one or more other devices. Process 800 is described with reference to components in figures described above.

Process 800 may include receiving LAG traffic at a non-master NID (block 810) and assigning traffic to a customer queue in the non-master NID (block 820). For example, assume NID 160 is designated as a non-master NID in the configuration of FIG. 1. As shown in FIG. 1, NID 160 may receive traffic via link 174 of LAG 170. NID 160 (e.g., traffic monitoring module 310) may identify a particular customer associated with the traffic (e.g., based on packet headers, originating port, etc.). NID 160 may assign traffic associated with the particular customer to a particular queue for that customer (e.g., queue 410-2).

Process 800 may also include requesting, from a master NID, tokens for traffic in the customer queue (block 830). For example, traffic from queue 410-2 in non-master policing module 330 (e.g., in NID 160) may be policed with traffic from queue 410-1 in master policing module 330 (e.g., in NID 150) to enforce an average transmission rate across both queues. NID 160 (e.g., non-master policing module 330) may provide token request 550 to NID 150 (e.g., master policing module 330) to manage packet transmission rates from queue 410-2. Token request 550 may be provided, for example, from NID 160 to NID 150 via inter-chassis link 180.

Process 800 may further include receiving tokens from the master NID for the traffic in the customer queue (block 840) and releasing the queued traffic according to the allocated tokens (block 850). For example, in response to token request 550, NID 150 (e.g., master policing module 330) may provide allocated tokens 560 to non-master queue regulator 610 for sending packets from queue 410-2 into the uplink/downlink traffic flow. NID 160 (e.g., non-master queue regulator 610) may apply tokens to packets from queue 410-2.

In systems and/or methods described herein a pair of NIDs in a LAG may be connected together via an inter-chassis link. A master network interface device may be configured to receive, via a first link of the LAG, a first traffic flow associated with a service level; receive, from a non-master NID, an indication of a second traffic flow, for the same service level, traversing a second link of the LAG; and apply collective rate limiting criteria to the first traffic flow and the second traffic flow, such that the collective rate limiting criteria enforces a traffic rate for the service level. A non-master NID may be configured to receive, via the second link of the LAG, the second traffic flow associated with the service level; and send, to the master NID, the indication of a second traffic flow.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIGS. 7 and 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component," a "module," "logic," or a "system" that performs one or more functions. These may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by a network interface device of multiple network interface devices, a configuration setting identifying the network interface device as a master network interface device for a link aggregation group, the link aggregation group including multiple links, with each of the multiple links coupling two end point devices and the multiple links acting as single logical connection between the two end point devices;

receiving, by the master network interface device and via a first active link of the link aggregation group, a first packet flow associated with a particular customer;

receiving, by the master network interface device and from a non-master network interface device of the multiple network interface devices via an inter-chassis link, an indication of a second packet flow, associated with the particular customer, received at the non-master network interface device and traversing a second active link of the link aggregation group;

applying, by the master network interface device, collective rate limiting criteria to the first packet flow associated with a particular customer and to the second packet flow associated with the particular customer, wherein the collective rate limiting criteria enforces a traffic rate of a service level agreement for the particular customer collectively over the first active link and the second active link of the single logical connection, and wherein applying the collective rate limiting criteria comprises:

applying, by the master network interface device, an arbitration scheme to allocate a first group of policer tokens for the first packet flow, received by the master network interface device, and a second group of policer tokens, received at the non-master network interface device, for the second packet flow, wherein the first group of policer tokens and the second group of policer tokens are allocated from a single token bucket associated with the master network interface device;

forwarding, by the master network interface device and via the first active link, at least some of the first packet flow based on the collective rate limiting criteria as applied to the first packet flow; and sending, by the master network interface device and to the non-master network interface device via the inter-chassis link, an indication of the collective rate limiting criteria as applied to the second packet flow over the second active link.

2. The method of claim 1, wherein the inter-chassis link includes a management link for control communications.

3. The method of claim 1, wherein the single token bucket is included within the master network interface device.

4. The method of claim 3, wherein the indication of the second packet flow associated with the particular customer and the indication of the collective rate limiting criteria as applied to the second packet flow are transmitted over the inter-chassis link in a shorter time period than that of a refresh rate of the single token bucket.

5. The method of claim 3, wherein the indication of the second packet flow associated with the particular customer includes a request for a particular amount of tokens from the single token bucket.

6. The method of claim 1, further comprising:
assigning the first packet flow to a particular customer queue in the master network interface device.

7. The method of claim 6, further comprising:
receiving, by the non-master network interface device and via the second active link of the link aggregation group, the second packet flow associated with the particular customer; and
assigning the second packet flow to a particular customer queue in the non-master network interface device.

8. The method of claim 1, further comprising:
sending, by the non-master network interface device and via the inter-chassis link, the indication of the second packet flow, associated with the particular customer, traversing the second active link of the link aggregation group.

9. A system, comprising:
a master network interface device comprising:
a master network interface configured to:
receive a configuration setting identifying the master network interface device as the master network interface device for a link aggregation group, the link aggregation group including multiple links, with each of the multiple links coupling two end point devices and the multiple links acting as single logical connection between the two end point devices,
receive, via a first active link of the link aggregation group, a first traffic flow associated with a service level for a particular customer, and
receive, from a non-master network interface device via an inter-chassis link, an indication of a second traffic flow, for the same service level and particular customer, received at the non-master network interface device and traversing a second active link of the link aggregation group,
a processor configured to apply collective rate limiting criteria to the first traffic flow and the second traffic flow, wherein the collective rate limiting criteria enforces a traffic rate for the service level collectively over the first active link and the second active link of the single logical connection, wherein, when applying the collective rate limiting criteria, the processor is further configured to:
apply an arbitration scheme to allocate a first group of policer tokens for the first traffic flow, received by the master network interface device, and a second group of policer tokens, received at the non-master network interface device, for the second traffic flow, wherein the first group of policer tokens and the second group of policer tokens are allocated from a single token bucket associated with the master network interface device; and
the non-master network interface device including a non-master network interface configured to:
receive, via the second active link of the link aggregation group, the second traffic flow associated with the service level, and
send, to the master network interface device, the indication of a second traffic flow.

10. The system of claim 9, wherein the master network interface device is further configured to:
forward, via the first active link, at least some of the first traffic flow based on the collective rate limiting criteria as applied to the first traffic flow, and
send, to the non-master network interface device via the inter-chassis link, an indication of the collective rate limiting criteria as applied to the second traffic flow.

11. The system of claim 10, wherein the non-master network interface device is further configured to:
forward, via the second active link, at least some of the second traffic flow based on the indication of the collective rate limiting criteria as applied to the second traffic flow.

12. The system of claim 9, wherein the inter-chassis link provides control communications between the master network interface device and the non-master network interface device.

13. The system of claim 9, wherein the master network interface device further includes the single token bucket.

14. The system of claim 9, wherein the inter-chassis link is further configured to:
  transmit the indication of a second packet flow from the non-master network interface device to the master network interface device in a shorter time period than a refresh rate of the single token bucket.

15. The system of claim 9, wherein, when sending the indication of a second traffic flow, the non-master network interface device is further configured to:
  request for a particular amount of tokens from the single token bucket.

16. A non-transitory computer-readable medium having stored thereon sequences of instructions which, when executed by at least one processor, cause the at least one processor to:
  receive a configuration setting identifying a network interface device, of multiple network interface devices, as a master network interface device for a link aggregation group, the link aggregation group including multiple links, with each of the multiple links coupling two end point devices and the multiple links acting as single logical connection between the two end point devices;
  receive, via a first active link of a link aggregation group, a first packet flow associated with a particular customer;
  receive, from a non-master network interface device via an inter-chassis link, an indication of a second packet flow, associated with the particular customer, received at the non-master network interface device and traversing a second active link of the link aggregation group;
  apply collective rate limiting criteria to the first packet flow associated with the particular customer and to the second packet flow associated with the particular customer, wherein the collective rate limiting criteria enforces a traffic rate of a service level agreement for the particular customer collectively over the first active link and the second active link of the single logical connection, and wherein, when applying the collective rate limiting criteria, the instructions further cause the at least one processor to:
    apply an arbitration scheme to allocate a first group of policer tokens for the first packet flow and a second group of policer tokens for the second packet flow, wherein the first group of policer tokens and the second group of policer tokens are allocated from a token bucket associated with the master network interface device;
  forward, via the first active link, at least some of the first packet flow based on the collective rate limiting criteria applied to the first packet flow; and
  send, to the non-master network interface device via the inter-chassis link, an indication of the collective rate limiting criteria applied to the second packet flow.

17. The non-transitory computer-readable medium of claim 16, further comprising instructions which cause the at least one processor to:
  assign the first packet flow to a particular customer queue in the master network interface device.

18. The non-transitory computer-readable medium of claim 16, the token bucket is included within the master network interface device.

19. The method of claim 1, wherein allocating the first group of policer tokens for the first packet flow and the second group of policer tokens for the second packet flow comprises allocating the first group of policer tokens and the second group of policer tokens based on a round robin arbitration scheme.

20. The system of claim 9, wherein when allocating the first group of policer tokens for packets in the first traffic flow and the second group of policer tokens for packets in the second traffic flow, the processor is further configured to allocate the first group of policer tokens and the second group of policer tokens based on a round robin arbitration scheme.

* * * * *